April 22, 1952 J. D. CLARK ET AL 2,594,125
GLASS FEEDER AND METHOD OF FEEDING MOLD CHARGES
Filed May 18, 1950 2 SHEETS—SHEET 1
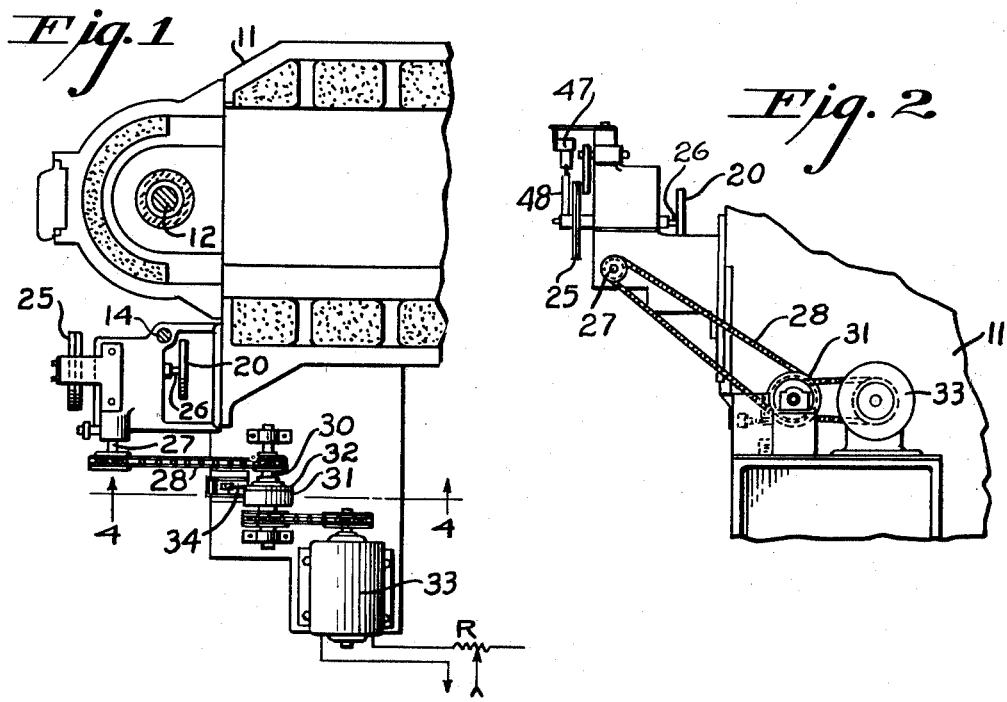
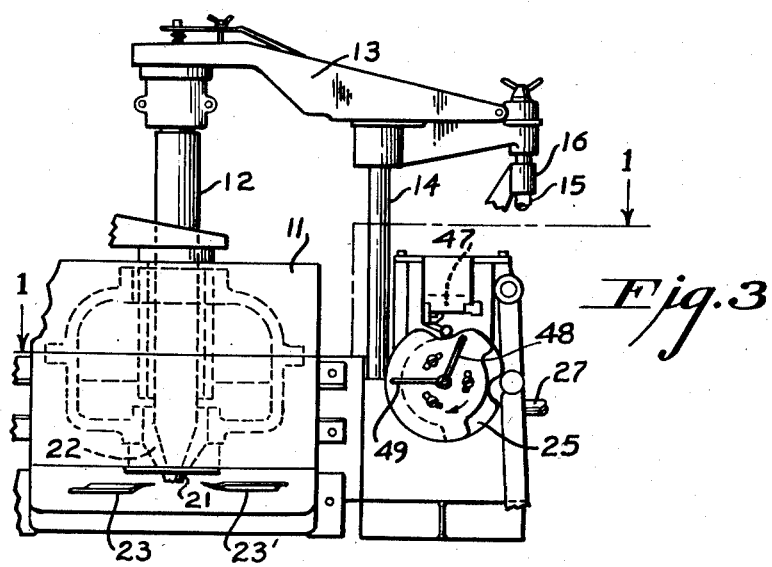
Inventors
JAMES DONALD CLARK
AND GEORGE J. MONTOPOLI
By
Rolf E. Schneider
Attorney April 22, 1952  J. D. CLARK ET AL  2,594,125
GLASS FEEDER AND METHOD OF FEEDING MOLD CHARGES
Filed May 18, 1950  2 SHEETS—SHEET 2

Inventors
JAMES DONALD CLARK
AND GEORGE J. MONTOPOLI
By Rolf E. Schneider
Attorney Patented Apr. 22, 1952

2,594,125

UNITED STATES PATENT OFFICE 2,594,125

GLASS FEEDER AND METHOD OF FEEDING MOLD CHARGES

James Donald Clark and George J. Montopoli, Corning, N. Y., assignors to Corning Glass Works, Corning, N. Y., a corporation of New York Application May 18, 1950, Serial No. 162,732

9 Claims. (Cl. 49—55)

The present invention relates to the feeding of mold charges of molten glass through a bottom outlet in a forehearth of a glass-melting tank or the like.

The prime object of the invention is the provision of a glass-feeding system which is of particular utility under circumstances wherein the tank capacity is only sufficient for a restricted rate of output, or wherein the speed of operation of the associated glass-fabricating machinery is so slow that conventional automatic methods of feeding charges thereto are impracticable.

Equipment for feeding molten-glass mold charges, severed while in suspension below a source of glass supply, for delivery en masse to the molds of associated glassware fabricating machinery, has been highly developed and is well known. The apparatus described in Peiler Patent No. 1,760,254, granted May 27, 1930, is representative of such equipment and includes a gob-feeding needle or plunger arranged over a forehearth bottom outlet and adapted to be continuously reciprocated vertically to extrude gobs or mold charges through such outlet, while shears operating in coordination with the needle sever the extruded charges from the parent supply body. Although the needle in its lowermost position does not close the outlet, the outlet size and the frequency of operation of the needle are so coordinated with the glass viscosity that only mold charges issue from the outlet. Operation in this fashion is the accepted practice.

It would appear at first blush that mold charges could be fed at a slower rate with such apparatus by simple adjustment thereof so that, upon completion of its downstroke, the needle would close the outlet and would be maintained in such position for any desired period, thus spacing the charges to meet such slower rate of operation. It is not practicable to do so, however, since the glass near the outlet becomes chilled, and the subsequent mold charge is thereby rendered worthless.

In the companion application of R. N. Sundstrom, Serial No. 80,917, filed March 11, 1949, there is described a system for such periodic formation of mold charges wherein the feeder needle is allowed to remain in its down position between its reciprocation cycles and a small glass stream is permitted to flow through the outlet during such periods. Satisfactory mold charges can be periodically produced by such system, irrespective of the time lapse between the formation of mold charges, without any undesirable chilling of the molten glass about the outlet area. In such system the small stream is diverted to a cullet chute and sheared from the parent body immediately preceding formation of the mold charge, and the mold charge is then itself sheared from the parent supply body and directed into a glass-forming mold.

This method of operation is open to objection, however, in that the flow of the small glass stream between the formation of the successive mold charges represents an undesirable waste of glass. When the formation of the successive mold charges must occur at wide time intervals, as is necessary with fabricating machinery requiring a considerable time lapse between the receipt of successive mold charges, such waste may become unduly excessive.

Applicants have now discovered that satisfactory mold charges may be successively delivered at widely spaced times without resort to such continued flow of glass during such intervals if the needle is adjusted to close the outlet so far as practicable during such intervals and any resulting chilled glass in the vicinity of the outlet is flushed therethrough and sheared from the parent supply body immediately preceding the formation of the mold charge. Under these circumstances, as with the system described in the Sundstrom application, the glass can be maintained at a viscosity deemed most suitable for formation, rather than at a compromise viscosity such as required by conventional feeders.

In applicants' system, shortly before a mold charge is to be formed, movement of the needle toward its up position is initiated. Before such movement is completed, however, it is interrupted to permit molten glass to flow through the previously closed outlet and to carry with it any chilled glass that may have formed as a result of such closing. Following this period of interruption, which may be varied in accordance with the conditions of any particular operation, the upward movement of the needle is resumed, and its cycle of reciprocation is completed to form the desired mold charge. Subsequent to the interruption of the upward movement of the needle, and advantageously as such upward movement is resumed, the stream of molten glass is sheared from the parent supply body. Upon completion of the reciprocation of the needle the formed mold charge is also sheared from the supply body, and the needle is then maintained in its down position until this cycle of operations is to be repeated.

Another advantage of applicants' system is that it affords a wide latitude of speeds of needle operation, enabling excellent control of the shape of mold charges produced. A further advantage of applicants' system is that the speed of operation of the needle can be varied at will to vary the mold charge weight without changing the frequency of charge delivery. A better shaped gob can thus be obtained in contrast with conventional feeder practice wherein the limited time during which the needle can be left in the down position seriously limits the latitude of adjustment of its rate of movement, and usually requires a glass viscosity higher than that best suited for use in the formation of the article to be produced, and wherein variation of speed of needle operation cannot be utilized to regulate the mold charge weight without also varying the frequency at which the charges are delivered.

A conventional feeder can be readily adapted for use in accordance with the invention by arranging for two operations of the shears per reciprocation of the needle, adjusting the needle to normally close the outlet, arranging to stop the needle between reciprocations and also during its upward movement, and giving the needle cam a contour found by experience to provide the character of movement best suited for formation of a mold charge when a glass of a viscosity best suited for such charge is provided.

The accompanying drawings illustrate sufficient apparatus to teach applicants' method in the light of the description and the disclosure of the Peiler patent. In such drawings:

Fig. 1 is a plan view with parts in section, approximately on line 1—1 of Fig. 3, of a portion of a forehearth and of an associated feeder equipment.

Fig. 2 is a side elevation of portions of the feeder equipment and the forehearth shown in Fig. 1.

Fig. 3 is a front elevation of the forehearth and the feeder equipment shown in Fig. 1, some details being omitted.

Figure 5:
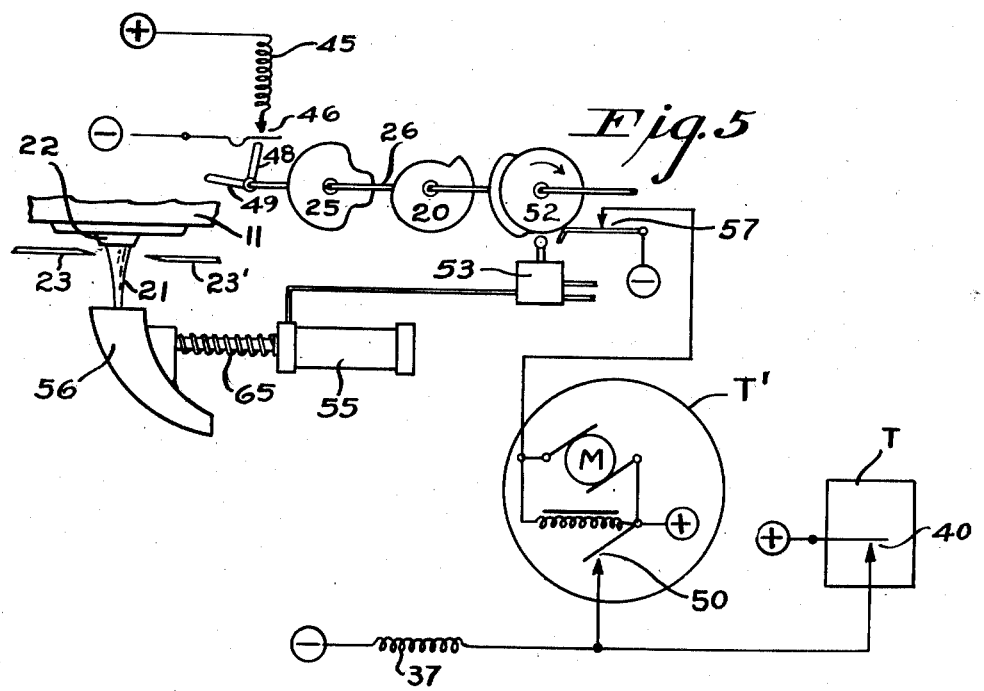

Fig. 5 diagrammatically illustrates a fragment of the forehearth shown in Fig. 1, an associated movable cullet chute with operating and control means therefor, and the operating mechanism and control circuits of the associated feeder equipment.

Referring to the drawings in detail, 11 represents the usual forehearth and 12 the usual feeder needle which is suspended from an arm 13 (Fig. 3). Arm 13 is guided for vertical reciprocation by a rod 14, which slides in suitable vertically spaced guide bearings, not shown. Turning movement and resulting displacement of needle 12 with respect to rod 14 are prevented by means of a rod 15 depending from arm 13 and passing through a bearing 16. Reciprocation of the needle is effected in a conventional manner, as fully shown and described in the Peiler patent, by means of a needle cam 20 (Figs. 1, 2 and 5).

Molten glass 21, issuing from forehearth outlet 22 (Fig. 3) is severed from the parent supply body of glass in forehearth 11 by shear blades 23 and 23'. These blades are operated by a conventional linkage, as fully shown and described in the Peiler patent, actuated by means of a shear cam 25 carried on a shaft 26 (Figs. 1, 2 and 5) also supporting the needle cam 20. Cam 25 differs from those conventionally employed only to the extent that its configuration is such that it effects two operations of blades 23 and 23' for each revolution of shaft 26 instead of the usual one such operation per revolution of the shaft.

As fully disclosed in the Peiler patent, shaft 26 carries a worm wheel driven by a worm gear on a transverse shaft such as shaft 27. In conventional practice the shaft corresponding to 27 is continuously driven at a speed dependent on the rate at which delivery of mold charges is desired, and, as previously explained, since the turning movement of the cam shaft is continuous, the upward movement of the needle by a cam, such as cam 20, substantially immediately follows its arrival at its lowermost position.

In accordance with the present invention, the needle 12 is adjusted to normally close the outlet 22 at the end of its downward movement and to maintain the outlet closed for any desired length of time. Just before a mold charge is to be formed and delivered the needle 12 is raised to and momentarily maintained in an intermediate position to permit molten glass to flow through the outlet and flush from the outlet area any chilled glass resulting from the closing thereof. A timing device is provided to thereafter reinitiate the upward movement of the feeder needle, advantageously during the initial stage of which movement the glass issuing from the outlet is sheared from the parent supply body and passed into a movable cullet chute at the time arranged under the outlet. An instant later such chute is moved clear of the path below the outlet, and the timing device is set into operation in preparation for its initiation of the needle movement during its next reciprocation cycle. During the final stage of the needle movement the mold charge, by that time suspended from the outlet, is sheared from the parent supply body and thus released for delivery to a forming mold.

Figure 4:
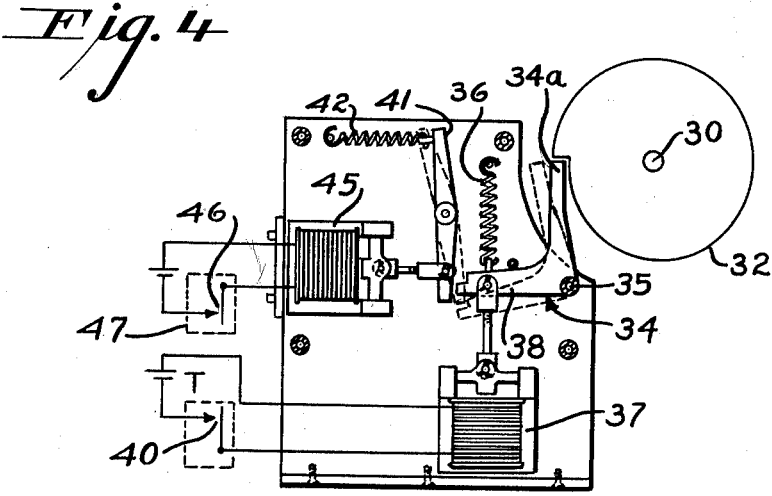
Fig. 4 is a sectional elevation, on an enlarged scale, of the control apparatus of the feeder equipment and is taken generally along line 4—4 of Fig. 1.

As shown in the drawings, shaft 27 (Fig. 1) is periodically driven, for example, by a chain 28 passing about a sprocket wheel carried by a countershaft 30. Shaft 30 is adapted to be driven by a motor 33 through the medium of a single revolution clutch 31 whenever its clutch control cam 32 (Figs. 1 and 4) is freed for rotation. A rheostat R enables ready adjustment of the speed of motor 33.

Cam 32 is normally held against rotation by arm 34a of a bell crank 34 (Figs. 1 and 4) pivoted at 35. A spring 36, attached to the other arm 38, normally holds arm 34a in the path of travel of cam 32. Movement of bell crank arm 34a clear of cam 32 is effected by energization of a magnet 37 whose armature is coupled to the other arm 38.

A lever 41 cooperative with arm 38 of bell crank 34 and under control of a spring 42 locks the bell crank in its acutated position the instant its arm 34a is moved clear of the cam 32. A magnet 45 is provided to move lever 41 clear of the bell crank arm 38 whenever movement of the needle 12 is to be discontinued. Energization of magnet 45 is effected by momentary closure of contacts 46 by either arm 48 or arm 49 carried by shaft 26. The arrangement is such that arm 49 is positioned to close contacts 46 of a switch 47 after cam 32 has started its last revolution required to turn shaft 26 sufficiently to raise needle 12 to the desired intermediate position, whereas arm 48 is positioned to close such contacts at the time necessary to stop the movement of the needle as it arrives at its lowermost or closed position.

Magnet 37 is momentarily energized at the frequency at which mold charges are desired, as determined by the frequency at which contacts 40 of a timing device T are set to close. A separate timing device T' is provided with contacts 50 for also closing the operating circuit for magnet 37 a variable predetermined time after the upward movement of needle 12 has been interrupted.

A chute 56 (Fig. 5), normally positioned under outlet 22, is adapted to be removed from under the outlet, against the tension of a return spring 65, by a pneumatic unit 55 under control of a valve 53. Valve 53 is operated by a cam 52 just after shear blades 23 and 23' have been actuated to shear the stream of glass 21 issuing by gravity from outlet 22, and is adapted to be held operated until after the blades 23 and 23' have operated to shear the mold charge. Cam 52 is also employed to actuate a pair of contacts 57 to close a circuit to timing device T' employed, as already described, to reinitiate the rotation of shaft 26 after the same has been stopped with needle 12 in its intermediate position.

Operation

A cycle of operation in brief is as follows: With the needle 12 in its down position, for all practicable purposes no glass flows from outlet 22. Upon momentary closing of the contacts 40 of timing device T, magnet 37 becomes energized and thus turns bell crank 34 leftward (as viewed in Fig. 4) about pivot 35 to move arm 34a clear of cam 32, thus freeing the cam 32 for rotation. Lever 41, under the influence of spring 42, immediately cooperates with bell crank arm 38 to lock it in its operated position independently of magnet 37, whose circuit is opened by contacts 40 almost immediately.

After the needle 12 has been raised substantially the desired amount, arm 49 on shaft 26 momentarily closes contacts 46 to energize magnet 45 whose associated lever 41 is thus moved clear of bell-crank arm 38 to permit arm 34a to again move into the path of cam 32 and be thus enabled to stop the turning movement of shaft 26 with needle 12 in its intermediate position. In this position sufficient molten glass is permitted to flow to clear the outlet of chilled glass. The flushing-out period is terminated by closure of the contacts 50 which again complete the circuit of magnet 37 to effect resumption of the turning of shafts 30, 27, and 26, and the consequent upward movement of needle 12. This movement tends to cause necking of the stream of molten glass and is almost immediately followed by actuation of the shear blades 23 and 23' by the shear cam 25.

As soon as the molten glass stream has been sheared, cam 52 actuates valve 53 causing the pneumatic unit 55 to move cullet chute 56 out from under outlet 22. At about the same time contacts 57 in the operating circuit of timing device T' are opened by cam 52, enabling it to reopen its contacts 50. As a revolution of shaft 26 is being completed, the needle 12 is raised farther and then lowered to extrude a mold charge. Just before needle 12 reaches its closed or lowermost position, shear cam 25 operates blades 23 and 23' to shear the mold charge. Almost immediately thereafter arm 48 on shaft 26 again closes contacts 46, thereby again completing the circuit of magnet 45 to stop the turning movement of shaft 26 as needle 12 arrives at its closed position, by which time arm 48 has moved clear of contacts 46. During this latter time the cam 52 also moves clear of valve 53, thereby enabling the spring 65 to return the chute 56 to under outlet 22 and to reclose contacts 57, thereby again initiating the operation of timing device T'.

We claim:

1. The method of periodically forming mold charges, which comprises initiating the flow of a stream of molten glass from a supply body after the lapse of the major portion of the time following the formation of the preceding mold charge, increasing the flow of glass from said supply body to form a mold charge in said stream, severing the stream from said supply body immediately preceding and immediately following formation of the mold charge therein, and immediately interrupting the flow of glass from the supply body following formation of the mold charge.

2. The method of periodically forming mold charges, which comprises issuing a mold charge from a supply body of molten glass, thereafter discontinuing the issuance of glass from such supply body for a substantial portion of the period before the issuance of the next mold charge therefrom, then issuing glass from such supply body for the remainder of the period immediately preceding the issuance of the subsequent mold charge from such supply body, increasing the flow of glass to issue such subsequent mold charge, and severing the issuing glass from the supply body immediately preceding and immediately following issuance of such subsequent mold charge therefrom.

3. The method of intermittently feeding charges of molten glass from a supply body through a submerged outlet of a container for such body, which comprises holding the outlet closed for the greater portion of the period between the issuance of charges therethrough, slightly opening the outlet for the remainder of such period to flush therethrough a stream of molten glass containing any chilled glass resulting from holding the outlet closed, thereafter opening the outlet wide and then reclosing it to extrude a charge therethrough, separating the stream from the supply body immediately preceding the extrusion of the charge through the outlet, and separating the charge from the supply body as the outlet is reclosed.

4. The method of periodically producing mold charges of molten glass from a supply body from a submerged orifice in a container for such body, which comprises flowing a stream of molten glass from the submerged orifice for a relatively short interval of time to remove any chilled glass from the orifice area resulting from discontinuance of the flow of glass from such orifice, severing said stream from the supply body at a point close to the orifice, immediately thereafter extruding a mold charge from the orifice, severing such mold charge from the supply body at a point close to the orifice, discontinuing the flow of glass from the orifice for a relatively long interval of time, and thereafter repeating said sequence of steps to form additional mold charges.

5. In a glass charge feeder for use with a container having a bottom outlet through which molten glass in the container can flow by gravity, a needle arranged over and adapted to periodically close said outlet, apparatus for periodically reciprocating said needle away from and toward said outlet to regulate the issuance of glass therethrough, said reciprocating apparatus including means adapted to maintain said needle in substantially closed position with respect to said outlet for a predetermined period following each reciprocation of said needle, means under whose control the reciprocation of the needle is interrupted and then resumed during movement of the needle away from the outlet, shear blades arranged below the outlet, and mechanism for actuating said blades following interruption of the movement of the needle away from the outlet, and for again actuating said blades at the completion of a reciprocation cycle of the needle.

6. A feeder such as defined by claim 5, wherein the means to maintain the needle in substantially closed position includes a timing device to control the time of initiation of the reciprocation of the needle and the means to interrupt reciprocation of the needle includes a separate timing device to control the time of resumption of its reciprocation.

7. A feeder such as defined by claim 6, wherein the reciprocating apparatus includes a shaft carrying a needle-operating cam, and a drive for said shaft including a clutch and a drive means therefor, and wherein the first timing device activates said clutch to initiate the rotation of said shaft by the drive means, and the separate timing device again activates the clutch to reinitiate the rotation of said shaft by the drive means following interruption of the needle movement.

8. An apparatus for periodically feeding charges of molten glass from a bottom outlet in a container for the same, which includes a feed-control needle within the container adapted to periodically close the outlet, means for reciprocating said needle away from and toward the outlet, said reciprocating means including means adapted to maintain said needle in substantially closed position with respect to said outlet for a predetermined period following each reciprocation of said needle, means for temporarily disabling said reciprocating means during the time that the needle is moving away from the outlet, shear blades arranged below the outlet, and means to actuate the shear blades after movement of the needle has been resumed to shear the glass issued from the outlet while said reciprocating means was temporarily disabled and to again actuate said shear blades to shear the glass issued from the outlet during completion of the reciprocation cycle of the needle.

9. An apparatus for periodically feeding charges of molten glass from a bottom outlet in a container for the same, which includes a glass flow-control device within the container adapted to periodically close said outlet, means for periodically operating said device to regulate the flow of glass through said outlet, said operating means including means adapted to maintain said flow-control device in substantially closed position with respect to said outlet for a predetermined period following each operation of said device, and means for temporarily interrupting the operation of said device during the initial portion of the glass flow, a severing device arranged below the outlet, and mechanism for actuating said severing device to sever the glass flowing through the outlet following the interruption of each operating cycle of said flow-control device and for again actuating said severing device to sever the glass flowing through said outlet at the completion of an operating cycle of said flow-control device.

JAMES DONALD CLARK.
GEORGE J. MONTOPOLI.

REFERENCES CITED

The following references are of record in the file of this patent:

UNITED STATES PATENTS

| Number | Name | Date |
|---|---|---|
| 1,720,496 | Tremblay | July 9, 1929 |
| 2,012,583 | Bates | Aug. 27, 1935 |
| 2,077,147 | Honiss | Apr. 13, 1937 |
| 2,126,351 | Sharp | Aug. 9, 1938 |
| 2,280,036 | Meyers | Apr. 14, 1942 |